US009714641B2

(12) United States Patent
Bagnara et al.

(10) Patent No.: US 9,714,641 B2
(45) Date of Patent: Jul. 25, 2017

(54) WIND POWER TURBINE FOR GENERATING ELECTRIC ENERGY

(71) Applicant: WINDFIN B.V., Leimuiden (NL)

(72) Inventors: Davide Bagnara, Vipiteno (IT); Matteo Casazza, Val di Vizze (IT); Leonardo Mandrioli, Luxembourg (LU)

(73) Assignee: WINDFIN B.V., Leimuiden (NL)

( * ) Notice: Subject to any disclaimer, the term of this patent is extended or adjusted under 35 U.S.C. 154(b) by 89 days.

(21) Appl. No.: 14/433,360

(22) PCT Filed: Oct. 4, 2013

(86) PCT No.: PCT/IB2013/059125
§ 371 (c)(1),
(2) Date: Apr. 2, 2015

(87) PCT Pub. No.: WO2014/054031
PCT Pub. Date: Apr. 10, 2014

(65) Prior Publication Data
US 2015/0252787 A1   Sep. 10, 2015

(30) Foreign Application Priority Data
Oct. 5, 2012   (IT) .............................. MI2012A1666

(51) Int. Cl.
*F03D 9/00* (2016.01)
*H02P 25/22* (2006.01)
(Continued)

(52) U.S. Cl.
CPC ............ *F03D 9/003* (2013.01); *F03D 7/028* (2013.01); *F03D 7/0264* (2013.01); *F03D 9/255* (2017.02);
(Continued)

(58) Field of Classification Search
CPC ... H02P 9/10; H02P 9/02; F03D 9/003; F03D 7/028; H02J 3/386
(Continued)

(56) References Cited

U.S. PATENT DOCUMENTS 8,680,702 B2 * 3/2014 Castelli Dezza ....... H02P 9/305
                                                        290/44
8,957,536 B2 * 2/2015 Gupta ................... F03D 7/0284
                                                        290/44
(Continued)

FOREIGN PATENT DOCUMENTS

WO   WO 2007/054729 A1   5/2007
WO   WO 2011/055175 A1   5/2011
(Continued)

OTHER PUBLICATIONS

International Search Report and Written Opinion for International Application No. PCT/IB2013/059125 dated May 13, 2014.
(Continued)

*Primary Examiner* — Julio C. Gonzalez R.
(74) *Attorney, Agent, or Firm* — Neal, Gerber & Eisenberg LLP (57) ABSTRACT

A wind power turbine configured to produce and feed electric energy to an electric power grid; the wind power turbine having: a blade assembly; at least one electric machine connected to the blade assembly to generate electric energy, and having a rotor, and a stator divided into a quantity or number of stator subsystems; and an electric transmission system configured to connect the quantity or number of stator subsystems to the electric power grid, and having an electric transmission assembly for, and connected to, each stator subsystem. The wind power turbine being characterized by having a control device connected to, and configured to receive malfunction signals from, the electric transmission assemblies, and configured to define an indi-
(Continued)

vidual target torque reference value on the basis of the malfunction signals from the electric transmission assemblies, so as to reduce discontinuity in the torque of the rotor.

25 Claims, 2 Drawing Sheets

(51) Int. Cl.
    *H02J 3/38*     (2006.01)
    *H02P 3/22*     (2006.01)
    *H02P 9/10*     (2006.01)
    *F03D 7/02*     (2006.01)
    *H02P 9/02*     (2006.01)
    *F03D 9/25*     (2016.01)

(52) U.S. Cl.
    CPC ............. *H02J 3/386* (2013.01); *H02P 3/22* (2013.01); *H02P 9/02* (2013.01); *H02P 9/10* (2013.01); *H02P 9/105* (2013.01); *H02P 25/22* (2013.01); *Y02E 10/763* (2013.01)

(58) Field of Classification Search
    USPC ..................... 290/55, 44; 307/31; 700/286
    See application file for complete search history.

(56) References Cited

U.S. PATENT DOCUMENTS

| | | | | |
|---|---|---|---|---|
| 2009/0295161 | A1* | 12/2009 | Steiner | F03D 7/0224 290/44 |
| 2010/0230966 | A1* | 9/2010 | Pavlak | F03D 9/002 290/44 |
| 2011/0148198 | A1* | 6/2011 | Tripathi | H02J 3/386 307/31 |
| 2011/0187108 | A1 | 8/2011 | Wakasa | |
| 2012/0133155 | A1* | 5/2012 | Sorg | F03D 7/02 290/1 C |
| 2016/0033580 | A1* | 2/2016 | Qiao | G01R 31/343 324/765.01 |

FOREIGN PATENT DOCUMENTS

| | | |
|---|---|---|
| WO | WO2011055175 | 5/2011 |
| WO | WO 2012/000508 A2 | 1/2012 |
| WO | WO2012000508 | 1/2012 |
| WO | WO 2012/073390 A1 * | 6/2012 |
| WO | WO2014054031 | 4/2014 |

OTHER PUBLICATIONS

First Examination Report for New Zealand Patent Application No. 706504, dated Oct. 19, 2016, 6 pages.

* cited by examiner

WIND POWER TURBINE FOR
GENERATING ELECTRIC ENERGY

PRIORITY CLAIM

This application is a national stage application of PCT/IB2013/059125, filed on Oct. 4, 2013, which claims the benefit of and priority to Italian Patent Application No. MI2012A 001666, filed on Oct. 5, 2012, the entire contents of which are each incorporated by reference herein.

BACKGROUND

Certain known wind power turbines feed energy to the electric power grid at a designated or given voltage, which must be the same as that of the grid, and supplies a designated or given current. The grid voltage is established by the electric power server to which the wind power turbine is connected, whereas the current output depends on the wind available and the power demand by the server.

During operation of such wind power turbines, malfunctions may occur (e.g., involving wind power turbine component parts or the electric power grid).

A malfunction in the electric transmission system produces a so-called torque breach (i.e., a sudden variation in torque on the shaft).

This torque breach produces severe stress and oscillation on the rotor, and particularly the blades, which may result in breakage of the blades.

To prevent this, the rotor and blades must be designed to withstand severe stress and oscillation, which includes equipping the wind power turbine with rotary structures, in particular blades, that are reinforced and oversized with respect to ordinary loads, thus increasing the weight and cost of the wind power turbine.

SUMMARY

The present disclosure relates to a wind power turbine configured to produce and feed electric energy to an electric power grid.

More specifically, the present disclosure relates to a wind power turbine configured to produce and feed electric energy to an electric power grid, and comprising:
  a blade assembly;
  an electric machine comprising a stator and a rotor configured to generate electric energy, and connected to the blade assembly;
  an electric transmission system configured to connect the stator to the electric power grid; and
  a control device configured to control the wind power turbine.

It is an advantage of the present disclosure to provide a wind power turbine configured to produce electric energy and configured to limit certain of the drawbacks of certain of the known art.

According to the present disclosure, there is provided a wind power turbine configured to produce and feed electric energy to an electric power grid; the wind power turbine comprising:
  a blade assembly;
  at least one electric machine connected to the blade assembly to generate electric energy, and comprising a rotor, and a stator divided into a quantity or number of stator subsystems; and
  an electric transmission system configured to connect the quantity or number of stator subsystems to the electric power grid, and comprising an electric transmission assembly for, and connected to, each stator subsystem;
  the wind power turbine comprising a control device connected to, and configured to receive malfunction signals from, the electric transmission assemblies, and configured to define an individual target torque reference value on the basis of the malfunction signals from the electric transmission assemblies, so as to reduce discontinuity in the torque of the rotor.

By virtue of the present disclosure, in the event of a malfunction, the maximum step in torque is less than in the known art, so the blade assembly can be made lighter and cheaper, by having to withstand less stress. In certain embodiments, the step in torque may be at most the nominal torque divided by the quantity or number of electric transmission assemblies. In the event of a malfunction in an electric transmission assembly, in certain embodiments, only the malfunctioning electric transmission assembly is deactivated, thus reducing discontinuity in the torque with respect to the known art. Moreover, by virtue of the control device redefining the individual target torque reference value in the event of malfunctions, it is possible to increase the individual target torque reference value of the operating electric transmission assemblies and so maintain a constant torque even in the event of a malfunction in one of the electric transmission assemblies.

It is a further advantage of the present disclosure to provide a wind power turbine configured to produce electric energy and configured to reduce oscillation and stress on the rotor and blades when braking.

According to the present disclosure, there is provided a wind power turbine configured to produce and feed electric energy to an electric power grid; the wind power turbine comprising:
  a blade assembly;
  at least one electric machine connected to the blade assembly to generate electric energy, and comprising a rotor and a stator; and
  an electric transmission system configured to connect the stator to the electric power grid, and comprising at least one electric transmission assembly;
  the wind power turbine being characterized by comprising a control unit configured to control the at least one electric transmission assembly, to perform a first braking step in a first or second or third braking mode, and to select the braking mode on the basis of the speed of the rotor, and in certain embodiments, on the basis of the torque of the rotor.

It is a further advantage of the present disclosure to provide a method of controlling a wind power turbine configured to produce electric energy, configured to eliminate certain of the drawbacks of certain of the known art.

According to the present disclosure, there is provided a method of controlling a wind power turbine configured to generate electric energy, the wind power turbine comprising:
  a blade assembly;
  at least one electric machine connected to the blade assembly to generate electric energy, and comprising a rotor, and a stator divided into a quantity or number of stator subsystems; and
  an electric transmission system configured to connect the quantity or number of stator subsystems to the electric power grid, and comprising an electric transmission assembly for, and connected to, each stator subsystem;
  the method comprising detecting malfunctions of each electric transmission assembly, and defining an individual target torque reference value on the basis of the detected malfunctions, so as to reduce discontinuity in the torque of the rotor.

It is a further advantage of the present disclosure to provide a method of controlling a wind power turbine configured to generate electric energy, configured to reduce oscillation and stress on the rotor and blades when braking.

According to the present disclosure, there is provided a method of controlling a wind power turbine configured to generate electric energy; the wind power turbine comprising:

a blade assembly;
at least one electric machine connected to the blade assembly to generate electric energy, and comprising a rotor and a stator; and
an electric transmission system configured to connect the stator to the electric power grid, and comprising at least one electric transmission assembly;
the method comprising the steps of controlling the at least one electric transmission assembly to perform a first braking step in a first or second or third braking mode; and selecting the braking mode on the basis of the speed of the rotor and, in certain embodiments, on the basis of the torque of the rotor.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which.

Additional features and advantages are described in, and will be apparent from the following Detailed Description and the figures.

DETAILED DESCRIPTION

Figure 1:
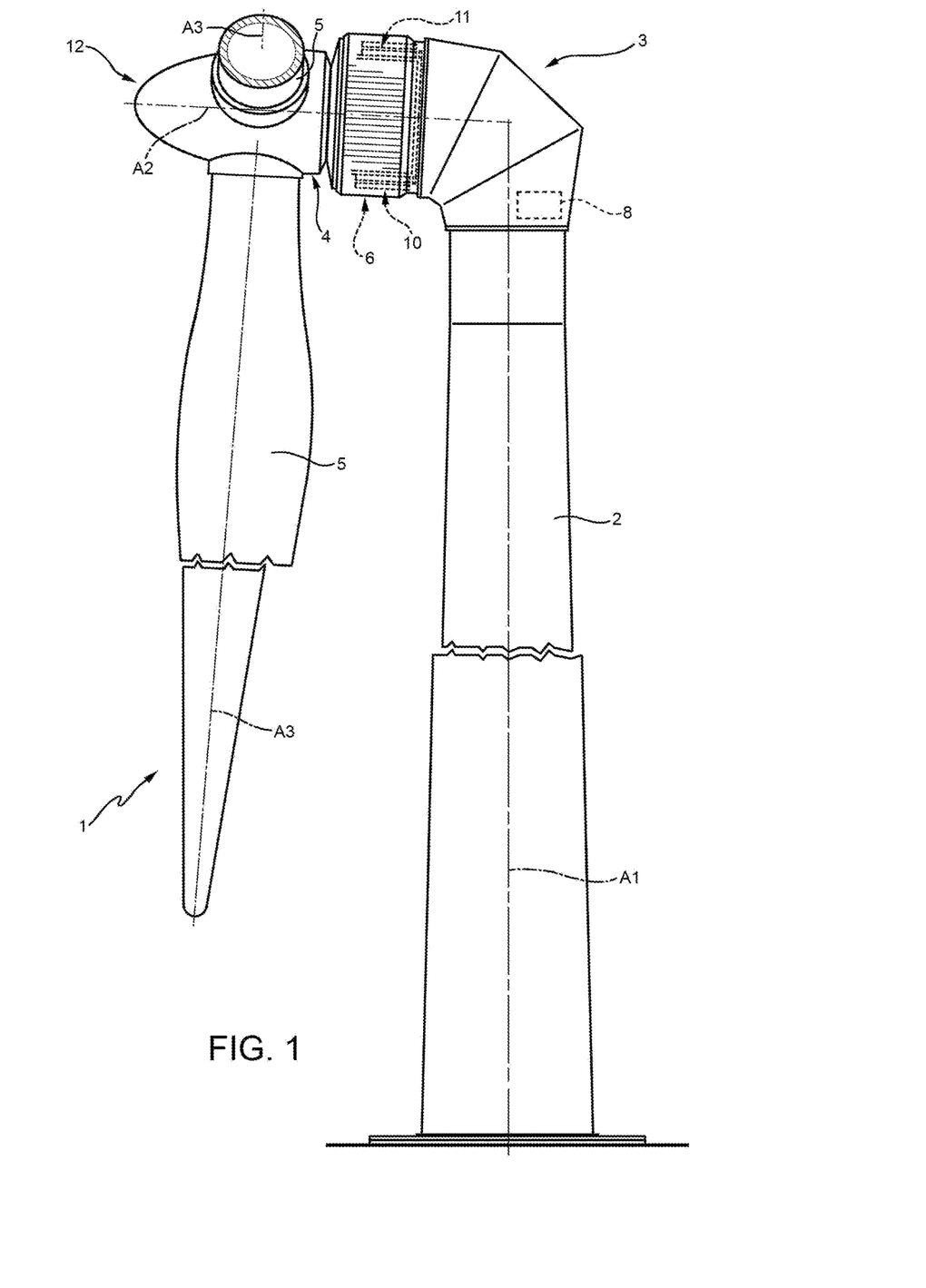
FIG. 1 shows a partly sectioned side view, with parts removed for clarity, of a wind power turbine in accordance with one embodiment of the present disclosure.
Figure 2:
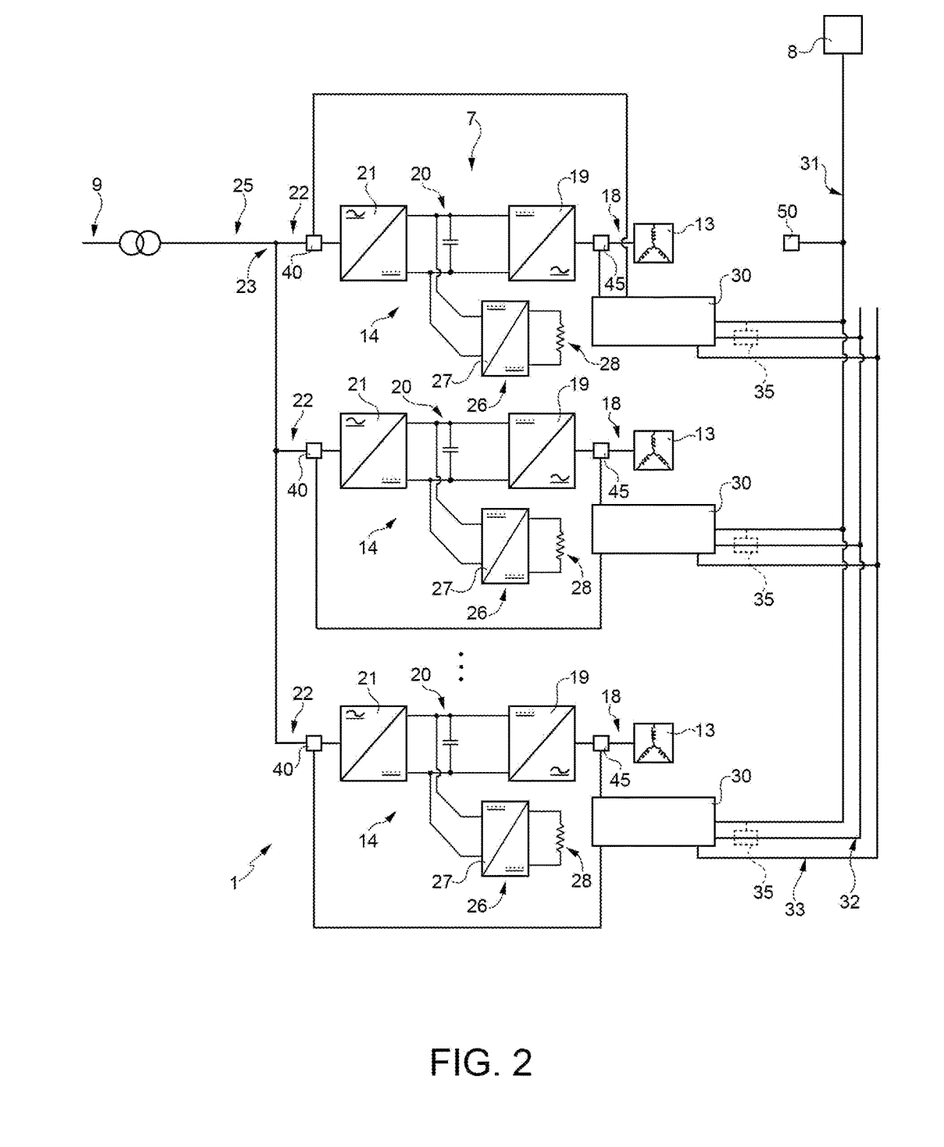
FIG. 2 shows an operating block diagram of the FIG. 1 embodiment of the wind power turbine.

Referring now to the example embodiments of the present disclosure illustrated in FIGS. 1 to 2, number 1 in FIG. 1 indicates a wind power turbine—in the example shown, a direct-drive, variable-angular-speed wind power turbine—configured to generate electric energy.

Wind power turbine 1 comprises a supporting structure 2; a nacelle 3 connected to supporting structure 2 to rotate about an axis A1; a hub 4 connected to nacelle 3 to rotate about an axis A2; a blade assembly 5 comprising a quantity or number of blades 5 fitted to hub 4 and orientable about respective axes A3; an electric machine 6 characterized by a nominal speed $\omega_{nom}$, a maximum speed $\omega_{max}$, and a total nominal torque $C_{tot}^{nom}$; an electric transmission system 7 (FIG. 2); and a control device 8 configured to control wind power turbine 1.

With reference to FIG. 2, wind power turbine 1 is configured to produce and feed electric energy to an electric power grid 9.

With reference to FIG. 1, electric machine 6 comprises an annular stator 10; and an annular rotor 11 coupled magnetically and connected mechanically to stator 10 to rotate about axis A2 by use of a bearing assembly (not shown in the drawings). It should thus be appreciated that electric machine 6 is an annular electric generator.

Electric machine 6 is connected to electric power grid 9 by electric transmission system 7.

Hub 4 is fixed directly to rotor 11 to transfer wind-induced rotation to rotor 11.

Nacelle 3 is fixed to supporting structure 2 in rotary manner about axis A1, to position hub 4 and blades 5 into the wind.

With reference to FIG. 1, hub 4, blades 5, and rotor 11 define a rotary assembly 12 housed partly inside nacelle 3. In the example shown, rotor 11 is housed inside nacelle 3, and is supported solely by the bearing assembly at hub 4.

Stator 10 comprises a number N of stator subsystems, each comprising a multiphase stator winding 13. In certain embodiments of the present disclosure, the multiphase stator windings are three-phase.

Rotor 11 is hollow and comprises a quantity or number of magnetized modules—more specifically, permanent magnets—arranged in rotor segments.

In the example shown, electric machine 6 is a synchronous, such as a three-phase type; it being understood, however, that the present disclosure also applies to any type of rotating electric machine, such as asynchronous, three-phase, electric generators with a squirrel cage rotor, or synchronous electric generators with a rotor with rotor windings as opposed to permanent magnets.

Electric transmission system 7 comprises an electric transmission assembly 14 for each multiphase stator winding 13. In other words, electric transmission system 7 is divided into independent, electrically insulated electric transmission assemblies 14.

Each electric transmission assembly 14 comprises a multiphase—more specifically, three-phase—connection line 18; a switch converter 19 connected to electric machine 6 by multiphase connection line 18; a direct-current connection circuit (DC link) 20; a switch converter 21 connected by direct-current connection circuit 20 to switch converter 19; and a multiphase connection line 22 configured to connect switch converter 21 to electric power grid 9 at a switch point 23.

Switch converter 19 may comprise a controlled-switch bridge, such as an IGBT, power MOSFET, etc.

Switch converter 21 may comprise a controlled-switch bridge, such as an IGBT, power MOSFET, etc.

Each electric transmission assembly 14 also comprises a brake module 26 connected to direct-current connection circuit 20 and in turn comprising a direct-voltage converter 27, and an electric resistor 28. Direct-voltage converter 27 and electric resistor 28 are configured to dissipate a total amount of dissipatable energy $E^D_T$ of direct-current connection circuit 20. And, at each instant, the brake module defines a residual amount of dissipatable energy $E^D_r$ corresponding to the maximum electric power beyond which electric resistor 28 is damaged.

Each electric transmission assembly 14 comprises a control unit 30 connected to and configured to control respective switch converter 19; connected to and configured to control respective switch converter 21; and connected to and configured to control direct-voltage converter 27. Control unit 30 detects any malfunctions of switch converters 19 and 21 and converter 27.

Control device 8 is connected to each control unit 30 to control each electric transmission assembly 14.

Each electric transmission assembly 14 is located to operate independently of the other electric transmission assemblies 14, so operation of one electric transmission assembly 14 has no direct effect on operation of the others.

More specifically, operation of each electric transmission assembly 14 depends solely on the commands from control device 8, which, for this purpose, is connected to control units 30 by a communication bus 31.

In normal operating conditions, control unit 30 controls electric transmission assembly 14 so that the electric energy produced by electric machine 6 is fed to electric power grid 9. More specifically, control unit 30 adapts the voltage and/or electric frequency and/or electric current produced by multiphase stator winding 13 to the voltage and electric frequency of electric power grid 9. If a transformer 25 is provided, control unit 30 adapts the voltage and/or electric frequency and/or electric current produced by multiphase stator winding 13 to the voltage and electric frequency of the transformer branch 25 towards electric machine 6.

Control unit 30 also controls switch converter 19 to control the torque of rotor 11. More specifically, control unit 30 and switch converter 19 are configured to operate in a range ranging from an individual nominal torque value $C^{n^{nom}}$ to an individual minimum torque value $C^{n^{min}}$, and from a minimum speed $\omega^{min}$ to a maximum speed $\omega^{max}$. The individual nominal torque value $C^{n^{nom}}$ corresponds to an individual target nominal torque reference $C_d^{n^{nom}}$. The individual minimum torque value $C^{n^{min}}$ corresponds to an individual target minimum torque reference $C_d^{n^{min}}$. And control unit 30 controls switch converter 21 to control direct-current connection circuit 20 and feed current to electric power grid 9.

Each control unit 30 is connected to respective multiphase stator winding 13 to detect and control stator electric quantities.

For each control unit 30, wind power turbine 1 comprises a measuring block 45 connected to respective multiphase stator winding 13 to detect said stator electric quantities. More specifically, measuring block 45 is connected to respective multiphase connection line 18 to detect said stator electric quantities. Control unit 30 is connected to respective measuring block 45 to receive the stator electric quantities. More specifically, the stator electric quantities are stator currents $I_S$ flowing along respective multiphase connection line 18.

Wind power turbine 1 also comprises a speed sensor 50 (e.g., an encoder), connected to rotor 11 of electric machine 6 to detect the angular speed and position of rotor 11. Speed sensor 50 is also configured to supply the position of rotor 11. Speed sensor 50 is connected to control units 30. In certain embodiments of the present disclosure, the speed sensor is omitted, and the control unit estimates rotor speed from the stator electric quantities detected by the respective measuring block.

Control device 8 also defines a target torque reference $C_d$ calculated on the basis of various parameters of wind power turbine 1 and defined to maximize efficiency of wind power turbine 1; and then defines and supplies respective control units 30 with an individual target torque reference $C''_d$ equal to target torque reference $C_d$ divided by the number N of operating electric transmission assemblies 14.

Control units 30 therefore receive the stator electric quantities from respective measuring blocks 45. Each control unit 30 receives individual target torque reference $C''_d$ from control device 8, and acts on respective switch converters 19 and 21 on the basis of stator currents $I_S$, the speed of rotor 11, and the received individual target torque reference $C''_d$. The overall contributions of each control unit 30, which act on respective multiphase stator winding 13, produce a resisting torque $C_r$ of electric machine 6 equal to target torque $C_d$. More specifically, each control unit 30 performs a so-called current control, which may be vectorial.

In an alternative embodiment of the present disclosure, the stator electric quantities are phase voltages $V_s$ flowing along respective multiphase connection line 18. In which case, control unit 30 performs a so-called voltage control.

In an alternative embodiment of the present disclosure, stator currents $I_S$ and/or the speed of rotor 11 and/or the position of rotor 11 are calculated as opposed to being detected.

Wind power turbine 1 comprises a first electric power system 32 comprising an electric power line configured to power control units 30 and control device 8.

Wind power turbine 1 also comprises a second electric power system 33 comprising an electric power line configured to power control units 30 and control device 8 in the event of a malfunction in first electric power system 32. Wind power turbine 1 is thus amply safeguarded against malfunctions in first electric power system 32. So any malfunctions in first electric power system 32 do not result in a total torque breach, the torque of rotor 11 is never zeroed, and the mechanical structures of rotor 11 undergo no oscillation or stress, as in certain of the known art.

In an alternative embodiment, as opposed to an electric power line, electric power system 32 comprises a quantity or number of electric power storage units 35 (e.g., secondary batteries) (shown by dash lines in FIG. 2), one for each control unit 30. Storage units 35 are connected to, and supplied with electricity and charged by, first electric power system 31. When a control unit 30 is not powered by first electric power system 32, the respective storage unit 35 is activated to supply electric energy to control unit 30 to keep control unit running. Each electric power storage unit 35 comprises a sensor configured to determine electric power supply by first electric power system 32. And control device 8 is connected to storage unit 35 by communication bus 31 to send out an activating signal to activate storage unit 35.

Each electric transmission system 7 comprises a voltage and frequency sensor 40 located along multiphase connection line 22, between switch point 23 and respective switch converter 21, and connected to respective control unit 30. Utilizing voltage and frequency sensor 40, each control unit 30 detects undervoltage, overvoltage, no voltage, and abnormal variations in electric frequency on electric power grid 9.

As stated, control device 8 is connected to control units 30, which in turn are connected to respective switch converters 21, and so receive signals indicating correct operation of respective switch converters 21, and send these signals to control device 8. Control units 30 also receive signals from respective converters 27 indicating the voltage of the relative direct-current connection circuit 20.

More specifically, each control unit 30 is configured to detect a first group of malfunctions comprising the following malfunction events: undervoltage on electric power grid 9, overvoltage on electric power grid 9, no voltage on electric power grid 9, or abnormal variations in electric frequency on electric power grid 9; malfunctions of one or more switch converters 21, and overvoltage or undervoltage on direct-current connection circuit 20. On detecting a malfunction in the first group, each control unit 30 sends a first malfunction signal to control device 8.

Each control unit 30 is also configured to detect a second group of malfunctions comprising the following malfunction events: a malfunction of switch converter 19, of respective direct-current circuit 20, and/or respective multiphase stator winding 13. On detecting a malfunction in the second group, each control unit 30 sends a second malfunction signal to control device 8.

Control device 8 is configured to receive the first and second malfunction signals from the control units, and, on receiving a first malfunction signal, is configured to operate according to a first or second control method. More specifically, control device 8 is configured to select the first or second control method on the basis of internal parameters (e.g., by comparing the new individual target torque reference $C''_d$ with a maximum individual target torque reference $C''_d$ threshold), or on the basis of settings made by the server of electric power grid 9 or an operator.

On receiving a second malfunction signal, control device 8 is configured to operate according to the first control method.

In the first control method, control device 8 determines a number M of electric transmission assemblies 14 indicted by first or second malfunction signals; re-defines the value of each individual target torque reference $C''_d$ by dividing the target torque reference $C_d$ by a quantity or number of operating electric transmission assemblies 14 equal to number N minus number M; and sends the new individual target torque reference value $C''_d$ to the operating electric transmission assemblies. Moreover, wind power turbine 1 is configured to produce a total maximum power $P_T$. Each electric transmission assembly 14 and each stator subsystem 13 are configured to produce an individual maximum power $P_i$. Individual maximum power $P_i$ equals total maximum power $P_T$ divided by the number N of stator subsystems 13 minus a robustness coefficient R. So, operation of wind power turbine 1 at total maximum power $P_T$ is guaranteed, even in the event of a number or quantity of non-operating stator subsystems or electric transmission assemblies 14. The maximum number or quantity of non-operating stator subsystems or electric transmission assemblies, at which operation of the wind power turbine at total maximum power $P_T$ is guaranteed, equals robustness coefficient R. In other words, in the first control method, electric transmission assemblies 14 operate in conditions over and above nominal operating conditions to compensate for non-operation of one or more electric transmission assemblies 14.

In the second control method, control unit 30 of the malfunctioning electric transmission assembly 14 acts on the electric transmission assembly 14 by performing a braking procedure. During the braking procedure, control unit 30 is configured to control direct-voltage converter 27 to connect electric resistor 28 associated with electric transmission assembly 14 to direct-current connection circuit 20, and to control power dissipation of electric brake resistor 28. Utilizing the braking procedure, the malfunctioning electric transmission assembly 14 is deactivated and the torque of rotor 11 decreases, thus also reducing the electric energy produced. The reduction in torque equals the total nominal torque of wind power turbine 1 divided by the number N of converters.

During the second control method braking procedure, each control unit 30 performs a first and second braking step.

Control unit 30 defines a duration T' of the first braking step. Duration T' of the first braking step is defined by the total dissipatable energy $E^d_T$ and the residual dissipatable energy $E^d_r$ of resistor 28. More specifically, duration T' equals the time taken by resistor 28 for residual dissipatable energy $E^d_r$ to equal half total dissipatable energy $E^d_T$. In other words, the first braking step continues until the residual dissipatable energy $E^d_r$ in resistor 28 equals half total dissipatable energy $E^d_T$.

During the first braking step, control unit 30 operates: in a first braking mode, when the speed $\omega$ of rotor 11 is less than or equal to the nominal speed of electric machine 6; in a second braking mode, when the speed $\omega$ of rotor 11 is greater than the nominal speed of electric machine 6, and the torque equals nominal torque; and in a third braking mode, when the speed $\omega$ of rotor 11 is greater than the nominal speed $\omega_n$ of electric machine 6, and the torque is less than nominal torque.

In first braking mode, control unit 30, on detecting the malfunction, records a memorized individual target torque reference value $C''^R_d$ from control device 8; determines an estimated speed $\omega^i$ of rotor 11 on detecting the malfunction; and defines the individual target torque reference $C''_d$ on the basis of a first frequency domain function. The first frequency domain function is a piecewise-linear defined in a Cartesian system, in which the x axis indicates frequency $\omega$ given by the rotation speed $\omega$ of rotor 11, and the y axis indicates the torque C of rotor 11. The first function is defined by the following equations:

$$C^n_d(\omega) = m_1 \cdot (\omega - \omega^i) + C^{nR}_d \text{ for } \omega^{min} \le \omega \le \omega^i \quad [1]$$

where $m_1$ equals:

$$m_1 = \frac{C^{nR}_d - C^{nmin}_d}{(\omega^i - \omega^{min})} \quad [2]$$

$$c^n_d(\omega) = m_2 \cdot (\omega - \omega^i) + C^{nR}_d \text{ for } \omega \ge \omega^i \quad [3]$$

where $m_2$ equals:

$$m_2 = \frac{C^{nmax} - C^{nR}_d}{(\omega^{nom} - \omega^i)} \quad [4]$$

In second braking mode, control unit 30, on detecting the malfunction, records the individual target torque reference value $C''^R_d$ from control device 8; determines an estimated speed $\omega^i$ of rotor 11 on detecting the malfunction; and defines the individual target torque reference $C''_d$ on the basis of a second frequency domain function. The second frequency domain function is a piecewise-linear defined in a Cartesian system, in which the x axis indicates frequency $\omega$ given by the rotation speed $\omega$ of rotor 11, and the y axis indicates the torque C of rotor 11. The second function is defined by equations [5], [6], [7]:

$$C^n_d(\omega) = C^{nnom}_d \text{ for } \omega \ge \omega^{nom} \quad [5]$$

$$C^n_d(\omega) = m_3 \cdot (\omega - \omega^{nom}) + C^{nnom}_d \text{ for } \omega^{min} \le \omega \le \omega^{nom} \quad [6]$$

$$m_3 = \frac{C^{nnom}_d - C^{nmin}_d}{(\omega^{nom} - \omega^{min})} \quad [7]$$

In third braking mode, control unit 30, on detecting the malfunction, records the individual target torque reference value $C''^R_d$ from control device 8; determines an estimated speed $\omega^i$ of rotor 11 on detecting the malfunction; and defines the individual target torque reference $C''_d$ on the basis of a third frequency domain function. The third frequency domain function is a piecewise-linear defined in a Cartesian system, in which the x axis indicates frequency $\omega$ given by the rotation speed $\omega$ of rotor 11, and the y axis indicates the torque C of rotor 11. The third function is defined by the following equations:

$$C_d^n(\omega) = m_4 \cdot (\omega - \omega^i) + C_d^{nR} \text{ for } \omega \geq \omega^i \quad [8]$$

$$m_4 = K \quad [9]$$

$$C_d^n(\omega) = C_d^{nR} \text{ for } \omega^{nom} \leq \omega \leq \omega^i \quad [10]$$

$$C_d^n(\omega) = m_5 \cdot (\omega - \omega^i) + C_d^{nR} \text{ for } \omega^{min} \leq \omega \leq \omega^{nom} \quad [11]$$

$$m_5 = \frac{C_d^{ni} - C_d^{nmin}}{(\omega^{nom} - \omega^{min})} \quad [12]$$

where k is a project parameter and indicates a constant.

During the second braking step, control unit 30 acts on converter 19 so that the torque of rotor 11 zeroes along a ramp of duration T'". Duration T'" of the ramp is defined by control unit 30 and equals half total dissipatable energy $E^d{}_T$ divided by the power of converter 19 at the start of the second step. Control unit 30 also defines duration T'" of the ramp so that the sum of duration T' and duration T'" is less than or equal to a predetermined maximum time threshold $T_{max}$, which, in certain non-limiting embodiments, is 30 seconds.

Control unit 30 also detects a third group of malfunctions comprising the following malfunction events: a malfunction of communication bus 31, and an emergency stop control.

On detecting malfunctions in the third group, control unit 30 operates in first braking mode, second braking mode, or third braking mode, until rotor 11 stops rotating. More specifically, control unit 30 is configured to operate in first braking mode when the speed ω of rotor 11 is less than or equal to the nominal speed of electric machine 6; in second braking mode when the speed ω of rotor 11 is greater than the nominal speed of electric machine 6, and torque equals nominal torque; or in third braking mode when the speed ω of rotor 11 is greater than the nominal speed $\omega_n$ of electric machine 6, and torque C is less than nominal torque $C_{nom}$.

Clearly, changes may be made to the wind power turbine and method as described herein without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electric energy producing wind power turbine configured to feed electric energy to an electric power grid, said electric energy producing wind power turbine comprising:
   a blade assembly;
   an electric machine connected to the blade assembly, said electric machine configured to generate electric energy, and including a rotor and a stator;
   an electric transmission system configured to connect the stator to the electric power grid, said electric transmission system including at least one electric transmission assembly; and
   a control unit configured to:
   (i) control the at least one electric transmission assembly,
   (ii) perform a first braking step in one of a first braking mode, a second, different braking mode and a third, different braking mode, and
   (iii) select the braking mode based on a speed of the rotor, wherein:
      (A) the first braking mode is selected at least partially based on the speed of the rotor being less than or equal to a nominal speed of the electric machine,
      (B) the second braking mode is selected at least partially based on the speed of the rotor being greater than the nominal speed of the electric machine, and a torque of the rotor equaling a nominal individual torque, and
      (C) the third braking mode is selected at least partially based on the speed of the rotor being greater than the nominal speed of the electric machine and the torque of the rotor being less than a nominal torque.

2. The electric energy producing wind power turbine of claim 1, wherein the control unit is configured to select the braking mode based on the torque of the rotor.

3. The electric energy producing wind power turbine of claim 1, wherein the at least one electric transmission assembly includes:
   a first switch converter connected to the stator and configured to control stator electric quantities based on an individual target torque reference,
   a direct-current connection circuit connected to the first switch converter, and
   a second switch converter connected to the electric power grid and to the direct-current connection circuit, said second switch converter configured to transfer electric energy from the direct-current connection circuit to the electric power grid.

4. The electric energy producing wind power turbine of claim 3, wherein the control unit is configured to:
   detect at least one malfunction selected from the group consisting of: an undervoltage on the electric power grid, an overvoltage on the electric power grid, no voltage on the electric power grid, abnormal variations in frequency on the electric power grid, at least one malfunction of the second switch converter, an overvoltage in the direct-current connection circuit, an undervoltage in the direct-current connection circuit, and an activation of an emergency stop control, and
   perform the first braking step based on the detection of the at least one malfunction.

5. The electric energy producing wind power turbine of claim 3, wherein the control device is configured to:
   define a first duration of the first braking step based on a total dissipatable energy and a residual dissipatable energy of a braking module connected to the direct-current connection circuit.

6. The electric energy producing wind power turbine of claim 5, wherein the control unit is configured to:
   perform a second braking step,
   control the electric transmission assembly such that the torque of the rotor zeroes along a ramp having a second duration, and
   define the second duration of the ramp such that a sum of the first duration and the second duration is less than or equal to a predetermined maximum time threshold.

7. The electric energy producing wind power turbine of claim 6, wherein the predetermined maximum time threshold is about 30 seconds.

8. The electric energy producing wind power turbine of claim 1, wherein the control unit is configured to:
  detect a malfunction,
  record a memorized individual target torque reference value based on the detection of the malfunction,
  determine an estimated speed of the rotor based on the detection of the malfunction, and
  define the individual target torque reference based on a frequency domain function.

9. The electric energy producing wind power turbine of claim 8, wherein the control unit is configured to:
  select the first braking mode when the speed of the rotor is less than or equal to the nominal speed of the electric machine, and
  define the frequency domain function based on:
    a first equation of $C_d^n(\omega)=m_1 \cdot (\omega-\omega^i)+C_d^{n^R}$ for $\omega^{min} \leq \omega \leq \omega^i$, and
    a second equation of $C_d^n(\omega)=m_2 \cdot (\omega-\omega^i)+C_d^{n^R}$ for $\omega \geq \omega^i$, wherein:
      $C_d^n$ is the individual target torque reference,
      $\omega^i$ is the estimated speed of the rotor,
      $C_d^{n^R}$ is the memorized individual target torque reference value,
      $\omega$ is the speed of the rotor,
      $\omega^{nom}$ is the nominal speed of the electric machine,
      $m_1$ and $m_2$ are operating parameters, and
      $\omega^{min}$ is a minimum speed at which the control unit controls the electric transmission assembly.

10. The electric energy producing wind power turbine of claim 1, wherein the control unit is configured to
  select the second braking mode when the speed of the rotor is greater than the nominal speed of the electric machine, and the torque of the rotor equals the nominal individual torque; and
  define a frequency domain function based on:
    a first equation of $C_d^n(\omega)=C_d^{n^{nom}}$ for $\omega \geq \omega^{nom}$, and
    a second equation of $C_d^n(\omega)=m_3 \cdot (\omega-\omega^{nom})+C_d^{n^{nom}}$ for $\omega^{min} \leq \omega \leq \omega^{nom}$, wherein:
      $\omega$ is the speed of the rotor,
      $C_d^n$ is an individual target torque reference,
      $m_3$ is an operating parameter,
      $\omega^{nom}$ is the nominal speed of the electric machine,
      $C_d^{n^{nom}}$ is the nominal individual torque, and
      $\omega^{min}$ is a minimum speed of the rotor at which the control unit controls the electric transmission assembly.

11. The electric energy producing wind power turbine of claim 1, wherein the control unit is configured to:
  select the third braking mode when the speed of the rotor is greater than a nominal speed of the electric machine and the torque of the rotor is less than the nominal torque; and
  define a frequency domain function based on:
    a first equation of $C_d^n(\omega)=m_4 \cdot (\omega-\omega^i)+C_d^{n^R}$ for $\omega \geq \omega^i$; and
    a second equation of $C_d^n(\omega)=C_d^{n^R}$ for $\omega^{nom} \leq \omega \leq \omega^i$; and
    a third equation of $C_d^n(\omega)=m_5 \cdot (\omega-\omega^i)+C_d^{n^R}$ for $\omega^{min} \leq \omega \leq \omega^{nom}$; wherein:
      $m_4$ and $m_5$ are operating parameters,
      $\omega^i$ is an estimated speed of the rotor,
      $\omega^{nom}$ is the nominal speed of the electric machine,
      $\omega^{min}$ is a minimum speed of the rotor at which the control unit controls the electric transmission assembly,
      $\omega$ is the speed of the rotor,
      $C_d^n$ is an individual target torque reference, and
      $C_d^{n^R}$ is a memorized individual target torque reference value.

12. The electric energy producing wind power turbine of claim 1, wherein the control unit is configured to:
  perform a second braking step, and
  control the electric transmission assembly such that the torque of the rotor zeroes along a ramp having a second duration.

13. The electric energy producing wind power turbine of claim 12, wherein the control unit is configured to define the second duration based on a total dissipatable energy of the electric transmission assembly.

14. The electric energy producing wind power turbine of claim 1, wherein the stator is divided into a plurality of stator subsystems and the electric transmission system includes a plurality of electric transmission assemblies, one for, and connected to, each stator subsystem.

15. A method of controlling a wind power turbine configured to generate electric energy, the wind power turbine including a blade assembly, at least one electric machine connected to the blade assembly to generate electric energy, and including a rotor and a stator, and an electric transmission system configured to connect the stator to an electric power grid, said electric transmission system including at least one electric transmission assembly, said method comprising:
  controlling the at least one electric transmission assembly to perform a first braking step in one of a first braking mode, a second, different braking mode and a third, different braking mode; and
  selecting the braking mode based on a speed of the rotor, wherein:
    (i) the first braking mode is selected at least partially based on the speed of the rotor being less than or equal to a nominal speed of the electric machine,
    (ii) the second braking mode is selected at least partially based on the speed of the rotor being greater than the nominal speed of the electric machine, and a torque of the rotor equaling a nominal individual torque, and
    (iii) the third braking mode is selected at least partially based on the speed of the rotor being greater than the nominal speed of the electric machine and the torque of the rotor being less than a nominal torque.

16. The method of claim 15, which includes selecting the braking mode based on the torque of the rotor.

17. The method of claim 15, which includes defining a first duration of the first braking step based on a total dissipatable energy and a residual dissipatable energy of a braking module of the electric transmission assembly.

18. The method of claim 15, which includes:
  detecting a malfunction,
  recording a memorized individual target torque reference value based on the detection of the malfunction,
  determining an estimated speed of the rotor based on the detection of the malfunction, and
  defining the individual target torque reference based on a frequency domain function.

19. The method of claim 18, which includes:
  selecting the first braking mode when the speed of the rotor is less than or equal to the nominal speed of the electric machine, and
  defining the frequency domain function based on:
    a first equation of $C_d^n(\omega)=m_1 \cdot (\omega-\omega^i)+C_d^{n^R}$ for $\omega^{min} \leq \omega \leq \omega^i$, and
    a second equation of $C_d^n(\omega)=m_2 \cdot (\omega-\omega^i)+C_d^{n^R}$ for $\omega \geq \omega^i$, wherein:

$m_1$ and $m_2$ are operating parameters,
$\omega^i$ is the estimated speed of the rotor,
$\omega$ is the speed of the rotor,
$\omega^{nom}$ is the nominal speed of the electric machine,
$C^n{}_d$ is the individual target torque reference,
$C^n{}_d{}^R$ is the memorized individual target torque reference value, and
$\omega^{min}$ is a minimum speed at which the electric transmission assembly is controlled.

20. The method of claim 18, which includes selecting the second braking mode when the speed of the rotor is greater than the nominal speed of the electric machine, and the torque of the rotor equals the nominal individual torque, and defining the frequency domain function based on:
a first equation of $C_d{}^n(\omega) = C_d{}^{n^{nom}}$ for $\omega \geq \omega^{nom}$, and
a second equation of $C_d{}^n(\omega) = m_3 \cdot (\omega - \omega^{nom}) + C_d{}^{n^{nom}}$ for $\omega^{min} \leq \omega \leq \omega^{nom}$, wherein
$\omega$ is the speed of the rotor,
$m_3$ is an operating parameter,
$\omega^{nom}$ is the nominal speed of the electric machine,
$C^n{}_d$ is the individual target torque reference,
$C^n{}_d{}^{nom}$ is the nominal individual torque, and
$\omega^{min}$ is a minimum speed of the rotor at which the electric transmission assembly is controlled.

21. The method of claim 18, which includes:
selecting the third braking mode when the speed of the rotor is greater than the nominal speed of the electric machine, and the torque of the rotor is less than the nominal torque, and
defining the frequency domain function based on:
a first equation of $C_d{}^n(\omega) = m_4 \cdot (\omega - \omega^i) + C_d{}^{n^R}$ for $\omega \geq \omega^i$, and
a second equation of $C_d{}^n(\omega) = C_d{}^{n^R}$ for $\omega^{nom} \leq \omega \leq \omega^i$, and
a third equation of $C_d{}^n(\omega) = m_5 \cdot (\omega - \omega^i) + C_d{}^{n^R}$ for $\omega^{min} \leq \omega \leq \omega^{nom}$, wherein:

$m_4$ and $m_5$ are operating parameters;
$\omega$ is the speed of the rotor,
$\omega^i$ is the estimated speed of the rotor,
$\omega^{nom}$ is the nominal speed of the electric machine,
$\omega^{min}$ is a minimum speed of the rotor at which the electric transmission assembly is controlled,
$C^n{}_d$ is the individual target torque reference, and
$C^n{}_d{}^R$ is the memorized individual target torque reference value.

22. The method of claim 15, which includes:
performing a second braking step, and
controlling the electric transmission assembly such that the torque of the rotor zeroes along a ramp having a second duration.

23. The method of claim 22, which includes defining the second duration of the ramp such that a sum of the first duration and the second duration is less than or equal to a predetermined maximum time threshold.

24. The method of claim 23, wherein the predetermined maximum time threshold is about 30 seconds.

25. The method of claim 15, which includes:
detecting at least one malfunction selected from the group consisting of: an undervoltage on the electric power grid, an overvoltage on the electric power grid, no voltage on the electric power grid, abnormal variations in frequency on the electric power grid, a malfunction of a switch converter, an overvoltage in a direct-current connection circuit, an undervoltage in the direct-current connection circuit, and an activation of an emergency stop control, and
performing the first braking step based on the detection of the at least one malfunction.

* * * * *